(12) United States Patent
Ishii et al.

(10) Patent No.: US 10,950,389 B2
(45) Date of Patent: Mar. 16, 2021

(54) THIN-FILM CAPACITOR

(71) Applicant: TDK CORPORATION, Tokyo (JP)

(72) Inventors: Daiki Ishii, Tokyo (JP); Kazuhiro Yoshikawa, Tokyo (JP); Koichi Tsunoda, Tokyo (JP); Mitsuhiro Tomikawa, Tokyo (JP); Junki Nakamoto, Tokyo (JP); Kenichi Yoshida, Tokyo (JP)

(73) Assignee: TDK CORPORATION, Tokyo (JP)

( * ) Notice: Subject to any disclaimer, the term of this patent is extended or adjusted under 35 U.S.C. 154(b) by 119 days.

(21) Appl. No.: 16/360,405

(22) Filed: Mar. 21, 2019

(65) Prior Publication Data

US 2019/0304701 A1 Oct. 3, 2019

(30) Foreign Application Priority Data

Mar. 30, 2018 (JP) .............................. JP2018-067038

(51) Int. Cl.
*H01G 4/33* (2006.01)
*H01G 4/008* (2006.01)
*H01G 4/12* (2006.01)

(52) U.S. Cl.
CPC .............. *H01G 4/33* (2013.01); *H01G 4/008* (2013.01); *H01G 4/1227* (2013.01)

(58) Field of Classification Search
CPC .......... H01G 4/33; H01G 4/30; H01G 4/1227; H01G 4/008

USPC ...... 361/301.4, 321.1, 301.1, 305, 312, 313, 361/328
See application file for complete search history.

(56) References Cited

U.S. PATENT DOCUMENTS

| | | | |
|---|---|---|---|
| 2004/0130849 A1 | 7/2004 | Kurihara et al. | |
| 2006/0250749 A1 | 11/2006 | Kurihara et al. | |
| 2008/0164563 A1 | 7/2008 | Nomura et al. | |
| 2010/0118468 A1 | 5/2010 | Nomura et al. | |
| 2013/0342960 A1* | 12/2013 | Saita | H01G 4/01 361/305 |

FOREIGN PATENT DOCUMENTS

| | | |
|---|---|---|
| JP | 2004-214589 A | 7/2004 |
| WO | 2006/117912 A1 | 11/2006 |

* cited by examiner

*Primary Examiner* — Arun Ramaswamy
(74) *Attorney, Agent, or Firm* — Oliff PLC

(57) ABSTRACT

A thin-film capacitor satisfies a relationship of CTE1>CTE2>CTE3 regarding a linear expansion coefficient CTE1 of a base, a linear expansion coefficient CTE2 of a capacitance unit, and a linear expansion coefficient CTE3 of a barrier layer. The inventors have newly found that in a case in which such a relationship is satisfied, when a temperature falls from a deposition temperature, cracking occurring in the capacitance unit of the thin-film capacitor is prevented, and cracking occurring in the barrier layer is also prevented.

6 Claims, 6 Drawing Sheets

Fig.4

| BASE MATERIAL | CAPACITANCE UNIT ||  BARRIER LAYER ||
| | DIELECTRIC LAYER | ELECTRODE LAYER | FIRST LAYER | SECOND LAYER |
|---|---|---|---|---|
| CaTiO₃(40) | ZrO₂(11) | Cu(16.6) | ZrO₂(11) | SiC(6.6) |
| Al(23) | (Ba, Sr)TiO₃(9.7) | Au(14.3) | MgO(9.8) | HfO₂(3.8) |
| Ag(19.8) | SrTiO₃(9.4) | Ni(12.89) | (Ba, Sr)TiO₃(9.7) | SiN(3.5) |
| CaF(19.5) | BaTiO₃(9.37) | Pt(9) | SrTiO₃(9.4) | |
| Cu(16.6) | Al₂O₃(7.7) | | BaTiO₃(9.37) | |
| Au(14.3) | CaZrO₃(8.55) | | Al₂O₃(7.7) | |
| Ni(12.89) | | | | |

Fig.5

| | BASE MATERIAL | | CAPACITANCE UNIT | | BARRIER LAYER | | CTE RELATIONSHIP |
|---|---|---|---|---|---|---|---|
| SAMPLE 1 | Ni | 28 | BaTiO$_3$/Ni | 4.9 | SiO$_2$ | 0.2 | CTE1>CTE2>CTE3 |
| SAMPLE 2 | Ni | 28 | BaTiO$_3$/Ni | 4.9 | SiN | 0.2 | CTE1>CTE2>CTE3 |
| SAMPLE 3 | Ni | 28 | BaTiO$_3$/Ni | 4.9 | Al$_2$O$_3$ | 0.2 | CTE1>CTE2>CTE3 |
| SAMPLE 4 | Ni | 28 | BaTiO$_3$/Ni | 4.9 | BaTiO$_3$ | 0.2 | CTE1>CTE2>CTE3 |
| SAMPLE 5 | Cu | 28 | BaTiO$_3$/Ni | 4.9 | SiO$_2$ | 0.2 | CTE1>CTE2>CTE3 |
| SAMPLE 6 | Cu | 28 | BaTiO$_3$/Ni | 4.9 | SiN | 0.2 | CTE1>CTE2>CTE3 |
| SAMPLE 7 | Cu | 28 | BaTiO$_3$/Ni | 4.9 | Al$_2$O$_3$ | 0.2 | CTE1>CTE2>CTE3 |
| SAMPLE 8 | Cu | 28 | BaTiO$_3$/Ni | 4.9 | BaTiO$_3$ | 0.2 | CTE1>CTE2>CTE3 |
| SAMPLE 9 | Si | 200 | BaTiO$_3$/Ni | 4.7 | SiO$_2$ | 0.2 | CTE2>CTE1>CTE3 |
| SAMPLE 10 | Si | 200 | BaTiO$_3$/Ni | 4.7 | SiN | 0.2 | CTE2>CTE3>CTE1 |
| SAMPLE 11 | Si | 200 | BaTiO$_3$/Ni | 4.7 | Al$_2$O$_3$ | 0.2 | CTE2>CTE3>CTE1 |
| SAMPLE 12 | Si | 200 | BaTiO$_3$/Ni | 4.7 | BaTiO$_3$ | 0.2 | CTE2>CTE3>CTE1 |

| | CTE2/CTE1 | CTE3/CTE2 | CTE3/CTE1 | CRACKING AFTER DEPOSITION OF CAPACITANCE UNIT | CRACKING AFTER DEPOSITION OF BARRIER LAYER | CRACKING AFTER BARRIER LAYER DIPPING TEST |
|---|---|---|---|---|---|---|
| SAMPLE 1 | 0.92 | 0.05 | 0.04 | ABSENT | ABSENT | PRESENT |
| SAMPLE 2 | 0.92 | 0.30 | 0.27 | ABSENT | ABSENT | PRESENT |
| SAMPLE 3 | 0.92 | 0.65 | 0.60 | ABSENT | ABSENT | ABSENT |
| SAMPLE 4 | 0.92 | 0.79 | 0.73 | ABSENT | ABSENT | ABSENT |
| SAMPLE 5 | 0.71 | 0.05 | 0.03 | ABSENT | ABSENT | PRESENT |
| SAMPLE 6 | 0.71 | 0.30 | 0.21 | ABSENT | ABSENT | PRESENT |
| SAMPLE 7 | 0.71 | 0.65 | 0.46 | ABSENT | ABSENT | ABSENT |
| SAMPLE 8 | 0.71 | 0.79 | 0.56 | ABSENT | ABSENT | ABSENT |
| SAMPLE 9 | 4.439024 | 0.05 | 0.22 | PRESENT | PRESENT | PRESENT |
| SAMPLE 10 | 4.439024 | 0.30 | 1.31 | PRESENT | PRESENT | PRESENT |
| SAMPLE 11 | 4.439024 | 0.65 | 2.89 | PRESENT | PRESENT | PRESENT |
| SAMPLE 12 | 4.439024 | 0.79 | 3.51 | PRESENT | PRESENT | PRESENT |

*Fig.6*

| | BASE MATERIAL | CAPACITANCE UNIT | BARRIER LAYER | | | | | | | CTE2/CTE1 | CTE3/CTE2 | CTE3/CTE1 | CTE4/CTE1 |
|---|---|---|---|---|---|---|---|---|---|---|---|---|---|
| | | | FIRST LAYER | | SECOND LAYER | | THIRD LAYER | | | | | | |
| SAMPLE 13 | Ni | 28 | $BaTiO_3$/Ni | 4.9 | $Al_2O_3$ | 0.5 | SiN | 1 | | 0.92 | 0.65 | 0.60 | 0.27 |
| SAMPLE 14 | Ni | 28 | $BaTiO_3$/Ni | 4.9 | $Al_2O_3$ | 0.5 | SiN | 0.5 | | 0.92 | 0.65 | 0.60 | 0.27 |
| SAMPLE 15 | Ni | 28 | $BaTiO_3$/Ni | 4.9 | $Al_2O_3$ | 0.5 | SiN | 0.2 | | 0.92 | 0.65 | 0.60 | 0.27 |
| SAMPLE 16 | Ni | 28 | $BaTiO_3$/Ni | 4.9 | $BaTiO_3$ | 0.5 | SiN | 1 | | 0.92 | 0.65 | 0.73 | 0.27 |
| SAMPLE 17 | Ni | 28 | $BaTiO_3$/Ni | 4.9 | $BaTiO_3$ | 0.5 | SiN | 0.5 | | 0.92 | 0.65 | 0.73 | 0.27 |
| SAMPLE 18 | Ni | 28 | $BaTiO_3$/Ni | 4.9 | $BaTiO_3$ | 0.5 | SiN | 0.2 | | 0.92 | 0.65 | 0.73 | 0.27 |
| SAMPLE 19 | Ni | 28 | $BaTiO_3$/Ni | 4.9 | $BaTiO_3$ | 0.5 | $Al_2O_3$ | 0.5 | | 0.92 | 0.65 | 0.73 | 0.60 |
| SAMPLE 20 | Ni | 28 | $BaTiO_3$/Ni | 4.9 | $BaTiO_3$ | 0.5 | $Al_2O_3$ | 0.5 | SiN | 0.4 | 0.92 | 0.65 | 0.73 | 0.60 |
| SAMPLE 21 | Ni | 28 | $BaTiO_3$/Ni | 4.9 | $BaTiO_3$ | 0.5 | $Al_2O_3$ | 0.5 | SiN | 0.2 | 0.92 | 0.65 | 0.73 | 0.60 |
| SAMPLE 22 | Ni | 28 | $BaTiO_3$/Ni | 4.9 | $BaTiO_3$ | 0.2 | $Al_2O_3$ | 0.5 | SiN | 0.2 | 0.92 | 0.65 | 0.73 | 0.60 |
| SAMPLE 23 | Ni | 28 | $BaTiO_3$/Ni | 4.9 | $BaTiO_3$ | 0.2 | $Al_2O_3$ | 0.5 | SiN | 0.5 | 0.92 | 0.65 | 0.73 | 0.60 |
| SAMPLE 24 | Ni | 28 | $BaTiO_3$/Ni | 4.9 | $BaTiO_3$ | 0.2 | $Al_2O_3$ | 0.5 | $SiO_2$ | 0.2 | 0.92 | 0.65 | 0.73 | 0.60 |

| | CTE5/CTE1 | CTE4/CTE2 | CTE5/CTE2 | CTE4/CTE3 | CTE5/CTE4 | CRACKING AFTER DEPOSITION OF CAPACITANCE UNIT | CRACKING AFTER DEPOSITION OF BARRIER LAYER | CRACKING AFTER BARRIER LAYER DIPPING TEST (DIPPED FOR TEN MINUTES) | CRACKING AFTER BARRIER LAYER DIPPING TEST (DIPPED FOR ONE HOUR) |
|---|---|---|---|---|---|---|---|---|---|
| SAMPLE 13 | | 0.30 | | 0.45 | | ABSENT | ABSENT | ABSENT | PRESENT |
| SAMPLE 14 | | 0.30 | | 0.45 | | ABSENT | ABSENT | ABSENT | PRESENT |
| SAMPLE 15 | | 0.30 | | 0.45 | | ABSENT | ABSENT | ABSENT | ABSENT |
| SAMPLE 16 | | 0.30 | | 0.37 | | ABSENT | ABSENT | ABSENT | PRESENT |
| SAMPLE 17 | | 0.30 | | 0.37 | | ABSENT | ABSENT | ABSENT | PRESENT |
| SAMPLE 18 | | 0.30 | | 0.37 | | ABSENT | ABSENT | ABSENT | ABSENT |
| SAMPLE 19 | | 0.65 | | 0.82 | | ABSENT | ABSENT | ABSENT | ABSENT |
| SAMPLE 20 | 0.27 | 0.65 | 0.30 | 0.82 | 0.45 | ABSENT | ABSENT | ABSENT | PRESENT |
| SAMPLE 21 | 0.27 | 0.65 | 0.30 | 0.82 | 0.45 | ABSENT | ABSENT | ABSENT | ABSENT |
| SAMPLE 22 | 0.27 | 0.65 | 0.30 | 0.82 | 0.45 | ABSENT | ABSENT | ABSENT | ABSENT |
| SAMPLE 23 | 0.27 | 0.65 | 0.30 | 0.82 | 0.45 | ABSENT | ABSENT | ABSENT | PRESENT |
| SAMPLE 24 | 0.04 | 0.65 | 0.05 | 0.82 | 0.08 | ABSENT | ABSENT | ABSENT | PRESENT | ns
THIN-FILM CAPACITOR

CROSS-REFERENCE TO RELATED APPLICATIONS

This application is based upon and claims the benefit of priority from Japanese Patent Application No. 2018-67038, filed on 30 Mar. 2018, the entire contents of which are incorporated herein by reference.

TECHNICAL FIELD

The present disclosure relates to a thin-film capacitor.

Background

In the related art, thin-film capacitors having a structure in which a capacitance unit realized by alternately laminating electrode layers and dielectric layers is provided on a substrate are known. For example, Japanese Unexamined Patent Publication No. 2004-214589 and PCT International Publication No. WO 2006/117912 disclose a technology in which a barrier layer is provided between a capacitance unit provided on a substrate and a protective insulating layer covering the capacitance unit.

SUMMARY

In the thin-film capacitors in the related art described above, cracking may occur in the capacitance unit or the barrier layer during manufacturing. Particularly, cracking may occur when the temperature falls from a deposition temperature.

The inventors have repeatedly researched the foregoing cracking. As a result, the inventors have newly found a technology in which cracking can be significantly prevented.

The present disclosure provides a thin-film capacitor in which cracking is prevented.

According to an embodiment of the present disclosure, there is provided a thin-film capacitor including a base; a capacitance unit provided on a main surface of the base, a plurality of electrode layers and a plurality of dielectric layers are alternately laminated in the capacitance unit in a normal direction of the main surface; and a barrier layer made of an inorganic insulating material, covering a side surface of the capacitance unit and the main surface of the base continuously, and including a first layer in direct contact with the side surface of the capacitance unit. When a coefficient of thermal expansion (a linear expansion coefficient) of the base is CTE1, a linear expansion coefficient of the capacitance unit is CTE2, and a linear expansion coefficient of the first layer of the barrier layer is CTE3, a relationship of CTE1>CTE2>CTE3 is satisfied.

In the thin-film capacitor, the relationship of CTE1>CTE2>CTE3 is satisfied, thereby preventing a situation in which cracking occurs in the capacitance unit and the barrier layer when the temperature falls from a deposition temperature.

In the thin-film capacitor according to the embodiment, the first layer of the barrier layer may be in direct contact with the side surface of the capacitance unit and the main surface of the base. Both CTE3/CTE1 and CTE3/CTE2 may be larger than 0.3. In this case, cracking is further prevented.

In the thin-film capacitor according to the embodiment, the barrier layer may be constituted of a plurality of layers, in two adjacent layers of the plurality of layers constituting the barrier layer, a linear expansion coefficient of an inner layer closer to the capacitance unit may be higher than a linear expansion coefficient of an outer layer further away from the capacitance unit. Both a ratio of the linear expansion coefficient of each of the layers constituting the barrier layer to the linear expansion coefficient of the base and a ratio of the linear expansion coefficient of each of the layers constituting the barrier layer to the linear expansion coefficient of the capacitance unit may be larger than 0.3. In the case in which the barrier layer is constituted of a plurality of layers, cracking is further prevented.

In the thin-film capacitor according to the embodiment, when the barrier layer is constituted of a plurality of layers, in two adjacent layers of the plurality of layers constituting the barrier layer, a linear expansion coefficient of an outer layer further away from the capacitance unit is CTE3', and a linear expansion coefficient of an inner layer closer to the capacitance unit is CTE3" both CTE3'/CTE1 and CTE3'/CTE2 may be 0.3 or smaller, a thickness of the outer layer may be smaller than half a thickness of the inner layer, and CTE3'/CTE3" may be larger than 0.3. Even in a case in which the barrier layer includes an outer layer having a relatively low coefficient of linear expansion, cracking is effectively prevented by causing the thickness of the outer layer to be smaller than half the thickness of the inner layer and performing design such that CTE3'/CTE3" becomes larger than 0.3.

BRIEF DESCRIPTION OF THE DRAWINGS

FIG. 4 is a table showing an example of materials for a base, a capacitance unit, and a barrier layer.

FIG. 5 is a table showing experimental results according to examples of the present disclosure.

FIG. 6 is another table showing experimental results according to examples of the present disclosure.

DETAILED DESCRIPTION

Hereinafter, an embodiment and various examples will be described with reference to the drawings. The same reference signs are applied to parts which are the same or corresponding in each of the drawings, and duplicated description will be omitted.

Figure 1:
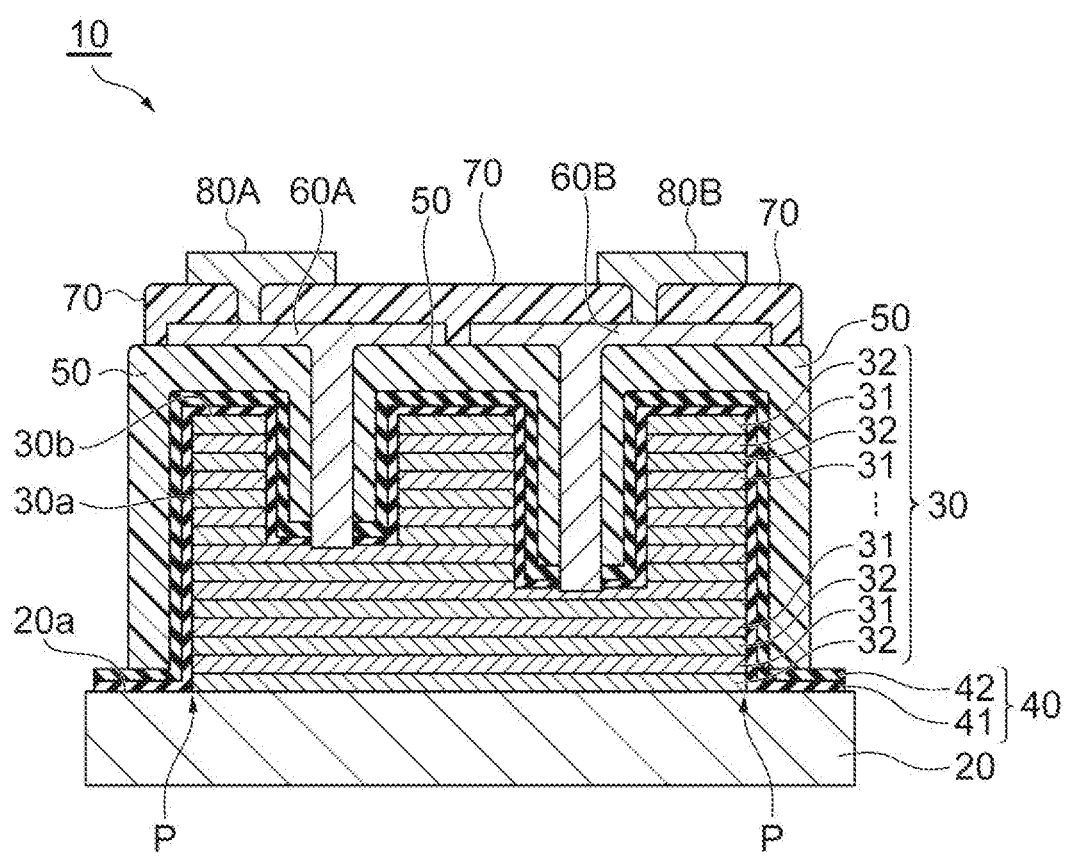
FIG. 1 is a schematic cross-sectional view illustrating a thin-film capacitor according to an embodiment of the present disclosure.

As illustrated in FIG. 1, a thin-film capacitor 10 is configured to include a base 20, a capacitance unit 30 provided on a main surface 20a of the base 20, and a barrier layer 40 covering the capacitance unit 30. The thin-film capacitor 10 according to the present embodiment has microscopic planar dimensions. As an example, the thin-film capacitor 10 has planar dimensions of 1.0 mm×0.5 mm.

The base 20 is formed of a metal foil. In the present embodiment, the base 20 is formed of a Ni foil. In addition to Ni, the base 20 can be formed of a metal material such as Al, Ag, Cu, or Au, or an alloy material thereof. In addition, the base 20 can be formed $CaTiO_3$ or CaF. For example, the thickness of the base 20 is within a range of 20 to 100 μm. As an example, the thickness thereof is 28 μm.

The capacitance unit 30 has a laminated structure in which a plurality of electrode layers 31 and a plurality of dielectric layers 32 are alternately laminated in a normal direction of the main surface 20a of the base 20. In the present embodiment, the electrode layer 31 is formed of Ni. In addition to Ni, the electrode layer 31 can be formed of a metal material such as Cu, Au, or Pt. In addition, in the present embodiment, the dielectric layer 32 is formed of $BaTiO_3$. In addition to $BaTiO_3$, the dielectric layer 32 can be formed of $SrTiO_3$, $(Ba, Sr)TiO_3$, $ZrO_2$, $Al_2O_3$, $CaZrO_3$ or the like. The capacitance unit 30 has a side surface 30a that is a surface to which the electrode layer 31 and the dielectric layer 32 are exposed and on which the electrode layer 31 and the dielectric layer 32 are arranged in a banded state. As illustrated in FIG. 1, the side surface 30a may be formed to extend in the normal direction of the main surface 20a of the base 20 or may be formed to tilt with respect to the normal direction by a predetermined angle.

The barrier layer 40 covers the side surface 30a and an upper surface 30b of the capacitance unit 30, and the main surface 20a of the base 20 around the capacitance unit 30. Particularly, the barrier layer 40 continuously covers the side surface 30a of the capacitance unit 30 and the main surface 20a of the base 20 such that corners P defined by the side surface 30a of the capacitance unit 30 and the main surface 20a of the base 20 are covered. The barrier layer 40 covers both a region in which the capacitance unit 30 is present and a region in which the capacitance unit 30 is not present on the main surface 20a of the base 20. Therefore, compared to a barrier layer having a flat form covering a flat surface, cracking is more likely to occur at a place covering corners or stepped portions.

The barrier layer 40 is constituted of a plurality of layers. In the present embodiment, the barrier layer 40 is constituted of two layers. That is, the barrier layer 40 is constituted of a first layer 41 which is in direct contact with the side surface 30a of the capacitance unit 30, the upper surface 30b, and the main surface 20a of the base 20, and a second layer 42 which covers the capacitance unit 30 and the base 20 with the first layer 41 interposed therebetween. The first layer 41 can be formed of an inorganic insulating material such as $ZrO_2$, MgO, $(Ba, Sr)TiO_3$, $SrTiO_3$, $BaTiO_3$, or $Al_2O_3$. In addition, the second layer 42 can be formed of an inorganic insulating material such as SiC, $HfO_2$, or SiN.

Moreover, the thin-film capacitor 10 includes a first insulating layer 50 covering the capacitance unit 30 with the barrier layer 40 interposed therebetween, a pair of wiring layers 60A and 60B connected to the electrode layer 31 of the capacitance unit 30 with the first insulating layer 50 interposed therebetween, a second insulating layer 70 covering the pair of wiring layers 60A and 60B, and a pair of terminals 80A and 80B respectively connected to the pair of wiring layers 60A and 60B with the second insulating layer 70 interposed therebetween. For example, the first insulating layer 50 and the second insulating layer 70 can be formed of a resin material such as polyimide, epoxy, phenyl, silicone, modified imide, or BCB. In addition, the first insulating layer 50 may be substituted with the barrier layer 40. The pair of wiring layers 60A and 60B and the pair of terminals 80A and 80B can be formed of Cu, Cu/Ni/Au, Cu/Ni/Pd/Au, Cu/Ni/Sn. Al/Ni/Au, or Al/Ni/Sn, for example.

Subsequently, a method of manufacturing the foregoing thin-film capacitor 10 will be described with reference to FIGS. 2A to 2C and 3A to 3C.

Figure 2A:
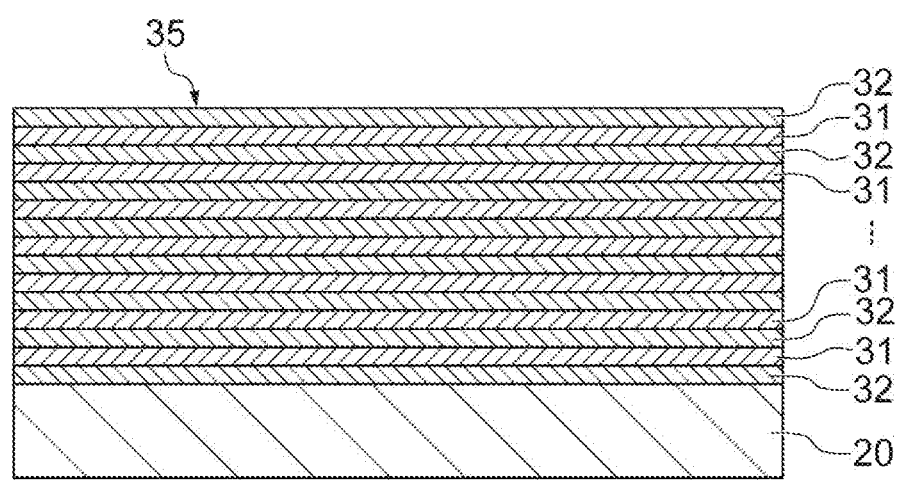
FIGS. 2A, 2B, and 2C show steps of a method of manufacturing the thin-film capacitor in FIG. 1.
Figure 2B:
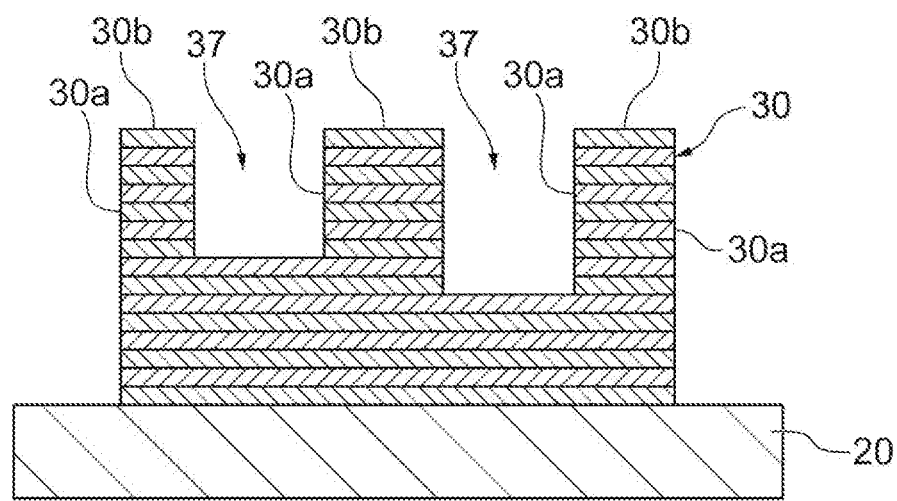
Figure 2C:
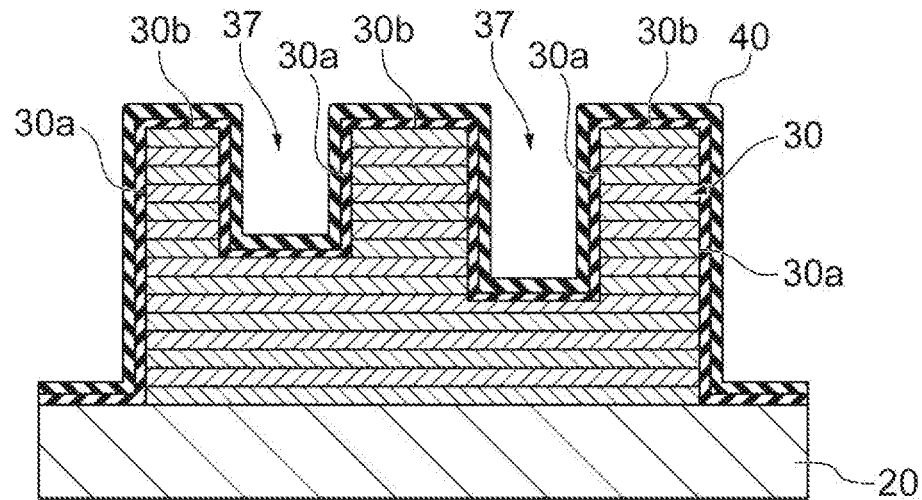

When the thin-film capacitor 10 is manufactured, first, as illustrated in FIG. 2A, a laminate 35, in which the plurality of electrode layers 31 and the plurality of dielectric layers 32 are alternately laminated on the main surface 20a of the base 20, is formed. Next, the laminate 35 is etched through RIE or the like, and the capacitance unit 30 is formed, as illustrated in FIG. 2B. In this case, a region of the capacitance unit 30 is defined through etching, and a hole 37 is formed in each of the regions in which the pair of wiring layers 60A and 60B are provided. As a result, the side surface 30a, to which the electrode layer 31 and the dielectric layer 32 are exposed, is formed on the outer peripheral surface of the capacitance unit 30 and the inner side surface of the hole 37. The electrode layer 31 is exposed to a bottom surface of each of the holes 37. Then, as illustrated in FIG. 2C, the barrier layer 40 is deposited such that the side surface 30a and the upper surface 30b of the capacitance unit 30 and the main surface 20a of the base 20 around the capacitance unit 30 are covered. Various deposition methods can be used for depositing the barrier layer 40. For example, a sputtering method or a PLD method can be used. In a case in which the first layer 41 of the barrier layer 40 is formed of $BaTiO_3$, baking is performed after a $BaTiO_3$ film is deposited.

Figure 3A:
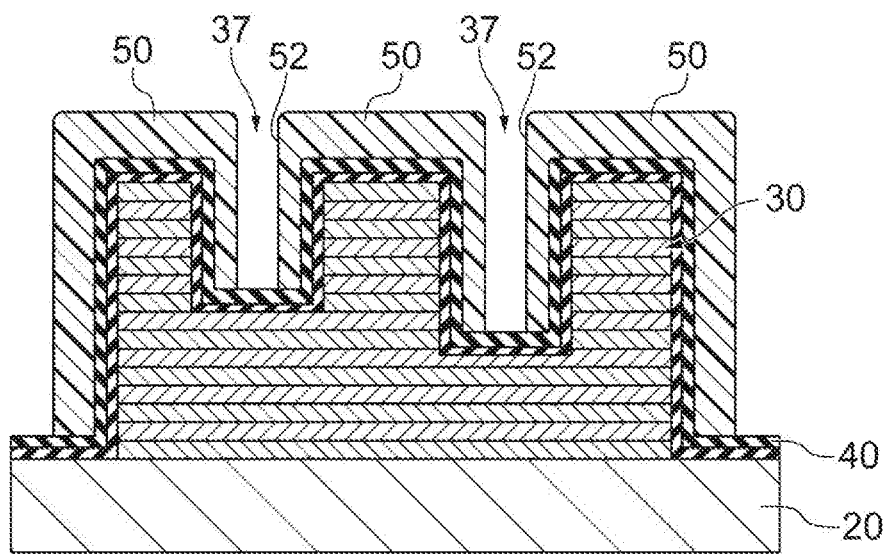
FIGS. 3A, 3B, and 3C show other steps of the method of manufacturing the thin-film capacitor in FIG. 1.
Figure 3B:
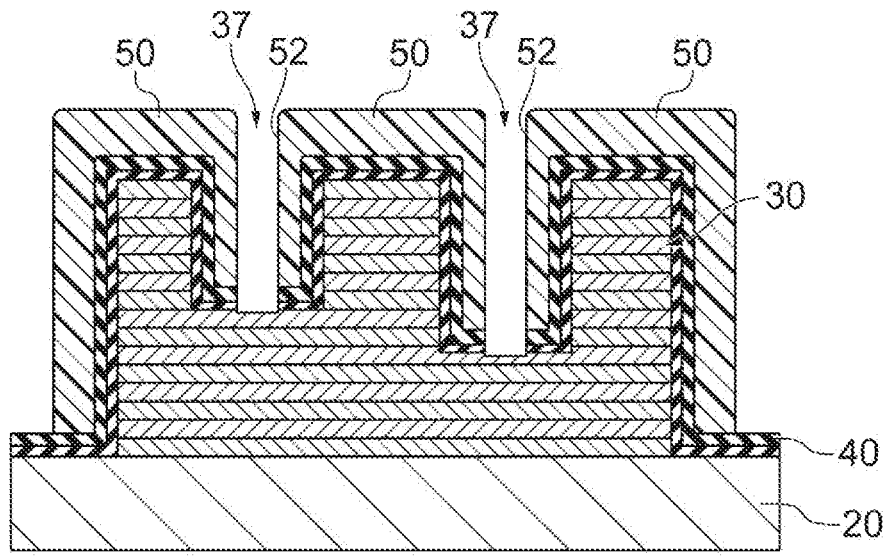
Figure 3C:
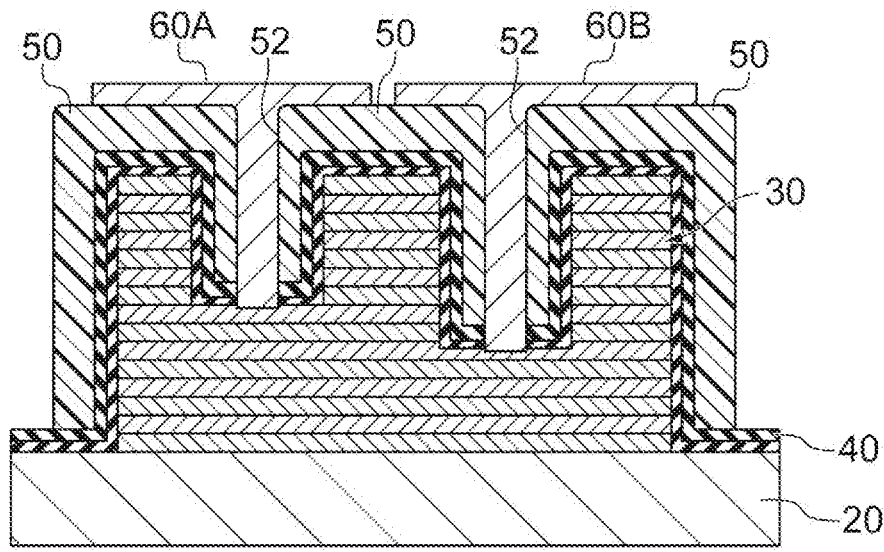

Moreover, as illustrated in FIG. 3A, the first insulating layer 50 is formed such that the barrier layer 40 is covered. Openings 52 are provided in the first insulating layer 50 such that the barrier layer 40 in a part covering the bottom surface of each of the holes 37 of the capacitance unit 30 is exposed. Then, as illustrated in FIG. 3B, etching is performed while having the first insulating layer 50 serving as a mask, and the barrier layer 40 in a part covering the bottom surface of each of the holes 37 is removed. Consequently, the electrode layer 31 constituting the bottom surface of each of the holes 37 is exposed. Subsequently, as illustrated in FIG. 3C, the pair of wiring layers 60A and 60B are formed on the first insulating layer 50 such that the openings 52 are filled. The pair of wiring layers 60A and 60B are electrically insulated from each other. The wiring layer 60A is connected to the electrode layer 31 exposed to one hole 37, and the wiring layer 60B is connected to the electrode layer 31 exposed to the other hole 37. Lastly, the second insulating layer 70 covering the pair of wiring layers 60A and 60B is formed. Moreover, the thin-film capacitor 10 described above is obtained by forming the pair of terminals 80A and 80B respectively connected to the pair of wiring layers 60A and 60B with the second insulating layer 70 interposed therebetween.

Here, the linear expansion coefficient of each of the constituent elements of the thin-film capacitor 10 will be described.

The base 20 has a relatively high linear expansion coefficient (CTE1), the capacitance unit 30 has a linear expansion coefficient (CTE2) lower than the CTE1, and the first layer 41 of the barrier layer 40 has a linear expansion coefficient (CTE3) lower than the CTE2. That is, the thin-film capacitor 10 satisfies a relationship of CTE1>CTE2>CTE3.

The table in FIG. 4 shows an example of materials of the base 20, the capacitance unit 30, and the barrier layer 40 which can satisfy the relationship of CTE1>CTE2>CTE3. The numerical values applied to each of the materials indicate the linear expansion coefficient ($10^{-6}$/K), For example, the first line shows a combination in which $CaTiO_3$ having a linear expansion coefficient of $40 \times 10^{-6}$/K is used for the material of the base 20, $ZrO_2$ having a linear expansion coefficient of $11 \times 10^{-6}$/K is used for the material of the dielectric layer 32 of the capacitance unit 30, Cu having a linear expansion coefficient of $16.6 \times 10^{-6}$/K is used for the material of the electrode layer 31 of the capacitance unit 30, $ZrO_2$ having a linear expansion coefficient of $11 \times 10^{-6}$/K is used for the material of the first layer 41 of the barrier layer 40, and SiC having a linear expansion coefficient of $6.6 \times 10^{-6}$/K is used for the material of the second layer 42 of the barrier layer 40. As long as the relationship of CTE1>CTE2>CTE3 is satisfied, the combination of the materials of the base 20, the capacitance unit 30, and the barrier layer 40 can be variously changed.

The linear expansion coefficient CTE2 of the capacitance unit 30 can be obtained using the ratio between the total thickness of the plurality of electrode layers 31 to the total thickness of the plurality of dielectric layers constituting the capacitance unit 30. That is, when the total thickness of the electrode layers 31 is x and the total thickness of the dielectric layer 32 is y, the linear expansion coefficient CTE2 of the capacitance unit 30 is obtained by the expression of "Linear expansion coefficient of material forming electrode layer $31 \times (x/(x+y))$+linear expansion coefficient of material forming dielectric layer $32 \times (y/(x+y))$".

The inventors have newly found that in a case in which the relationship of CTE1>CTE2>CTE3 is satisfied, when the temperature falls from a deposition temperature, cracking occurring in the capacitance unit 30 of the thin-film capacitor 10 is prevented, and cracking occurring in the barrier layer 40 is also prevented. In the barrier layer 40, although cracking is likely to occur in parts covering the corners P defined by the side surface 30a of the capacitance unit 30 and the main surface 20a of the base 20, cracking occurring in the corners P is significantly prevented in the thin-film capacitor 10.

In addition, the thin-film capacitor 10 is designed such that both CTE3/CTE1 and CTE3/CTE2 become larger than 0.3. The inventors have found that cracking can be further prevented in this case.

Moreover, in the thin-film capacitor 10, the barrier layer 40 is constituted of a plurality of layers, and the linear expansion coefficient of an inner layer closer to the capacitance unit is higher than the linear expansion coefficient of an outer layer further away from the capacitance unit in two adjacent layers of the plurality of layers constituting the barrier layer 40. Regarding the foregoing embodiment, the barrier layer 40 is constituted of the first layer 41 and the second layer 42 adjacent to each other, and the linear expansion coefficient CTE3 of the first layer (inner layer) 41 closer to the capacitance unit 30 is higher than a linear expansion coefficient CTE4 of the second layer (outer layer) 42 further away from the capacitance unit 30. In addition, the thin-film capacitor 10 is designed such that both the ratio of the linear expansion coefficient of each of the layers (the first layer 41 and the second layer 42) constituting the barrier layer 40 to the linear expansion coefficient CTE1 of the base 20 (CTE3/CTE1 and CTE4/CTE1) and the ratio of the linear expansion coefficient of each of the layers constituting the barrier layer 40 to the linear expansion coefficient CTE2 of the capacitance unit 30 (CTE3/CTE2 and CTE4/CTE2) become larger than 0.3. The inventors have found that cracking, can be further prevented in this case.

In the thin-film capacitor 10, when the barrier layer 40 is constituted of a plurality of layers and the linear expansion coefficient of an outer layer further away from the capacitance unit 30 in two adjacent layers of the plurality of layers constituting the barrier layer 40 is CTE3', a form in which CTE3'/CTE1 and CTE3'/CTE2 become 0.3 or smaller may be adopted. Regarding the foregoing embodiment, the barrier layer 40 is constituted of the first layer 41 and the second layer 42 adjacent to each other. Regarding the linear expansion coefficient CTE4 (CTE3') of the second layer (outer layer) further away from the capacitance unit 30, a form in which CTE4/CTE1 and CTE4/CTE2 become 0.3 or smaller may be adopted. In this case, when the thickness of the outer layer is smaller than half the thickness of the inner layer and the linear expansion coefficient of the inner layer is CTE3", the thin-film capacitor 10 may be designed such that CTE3'/CTE3" becomes larger than 0.3. Regarding the foregoing embodiment, the thickness of the second layer 42 of the barrier layer 40 is smaller than half the thickness of the first layer 41. Regarding the linear expansion coefficient CTE3 (CTE3") of the first layer 41 of the barrier layer 40, the thin-film capacitor 10 may be designed such that CTE4/CTE3 becomes larger than 0.3. The inventors have found that cracking is effectively prevented in this case.

EXAMPLES

Hereinafter, details and results of experiments performed by the inventors will be described with reference to the tables in FIGS. 5 and 6.

In order to check the relationship between each of the linear expansion coefficients (CTE1, CTE2, and CTE3) of the materials of the base 20, the capacitance unit 30, and the barrier layer 40, and cracking, the inventors prepared a plurality of samples formed of different materials and checked the presence or absence of cracking regarding each of the samples. The table in FIG. 5 shows the results thereof.

In samples 1 to 4 according to examples, a Ni foil with a thickness of 28 μm was used as the base 20. A laminate including seven Ni electrode layers with thicknesses of 0.5 μm and seven $BaTiO_3$ dielectric layers with thicknesses of 0.2 μm (total thickness of 4.9 μm) was used as the capacitance unit 30. In the sample 1, a $SiO_2$ layer with a thickness of 0.2 μm was formed as the barrier layer 40 having a single layer structure. In the sample 2, a SiN layer with a thickness of 0.2 μm was formed as the barrier layer 40 having a single layer structure. In the sample 3, an $Al_2O_3$ layer with a thickness of 0.2 μm was formed as the barrier layer 40 having a single layer structure. In the sample 4, a $BaTiO_3$ layer with a thickness of 0.2 μm was formed as the barrier layer 40 having a single layer structure. All of the samples 1 to 4 satisfied the relationship of CTE1>CTE2>CTE3.

Then, each of the samples 1 to 4 was checked for the presence or absence of cracking. The presence or absence of cracking was confirmed under three conditions, such as "after deposition of a capacitance unit", "after deposition of a barrier layer", and "after a barrier layer dipping test". Under the condition of "after deposition of a capacitance unit", the presence or absence of cracking was confirmed from the main surface 20a side of the base 20 using an optical microscope after the capacitance unit 30 was deposited and before the barrier layer 40 was deposited. Under the condition of "after deposition of a harrier layer", the presence or absence of cracking was confirmed from the main surface 20a side of the base 20 using an optical microscope after the barrier layer 40 was deposited. Under the condition of "after a barrier layer dipping test", the capacitance unit 30 was dipped into an etching solution for melting after the barrier layer 40 was deposited, and the capacitance unit 30 was checked for the presence or absence of melting using an optical microscope. In the barrier layer dipping test, cracking having a size which could not be viewed with only an optical microscope could be confirmed. Thus, the presence or absence of cracking could be checked with higher accuracy.

As a result, no cracking was confirmed in all of the samples 1 to 4 after deposition of a capacitance unit and after deposition of a barrier layer. In addition, regarding the samples 1 to 4, even after the barrier layer dipping test, no cracking was confirmed in the samples 3 and 4 in which both CTE3/CTE1 and CTE3/CTE2 were larger than 0.3.

In samples 5 to 8 according to the examples, a Cu foil with a thickness of 28 μm was used as the base 20. A laminate including seven Ni electrode layers with thicknesses of 0.5 μm and seven BaTiO₃ dielectric layers with thicknesses of 0.2 μm (total thickness of 4.9 μm) was used as the capacitance unit 30. In the sample 5, a SiO₂ layer with a thickness of 0.2 μm was formed as the barrier layer 40 having a single layer structure. In the sample 6, a SiN layer with a thickness of 0.2 μm was formed as the barrier layer 40 having a single layer structure. In the sample 7, an Al₂O₃ layer with a thickness of 0.2 μm was formed as the barrier layer 40 having a single layer structure. In the sample 8, a BaTiO₃ layer with a thickness of 0.2 μm was formed as the barrier layer 40 having a single layer structure. All of the samples 5 to 8 satisfied the relationship of CTE1>CTE2>CTE3.

Each of the samples 5 to 8 was checked for the presence or absence of cracking, and no cracking was confirmed in all of the samples 5 to 8 after deposition of a capacitance unit and after deposition of a barrier layer. In addition, regarding the samples 5 to 8, even after the barrier layer dipping test, no cracking was confirmed in the samples 7 and 8 in which both CTE3/CTE1 and CTE3/CTE2 were larger than 0.3.

In samples 9 to 12 according to comparative examples, a Si substrate with a thickness of 200 μm was used as the base 20. A laminate including seven Ni electrode layers with thicknesses of 0.5 μm and six BaTiO₃ dielectric layers with thicknesses of 0.2 μm (total thickness of 4.7 μm) was used as the capacitance unit 30. In the sample 9, a SiO₂ layer with a thickness of 0.2 μm was formed as the barrier layer 40 having a single layer structure. In the sample 10, a SiN layer with a thickness of 0.2 μm was formed as the barrier layer 40 having a single layer structure. In the sample 11, an Al₂O₃ layer with a thickness of 0.2 μm was formed as the barrier layer 40 having a single layer structure. In the sample 12, a BaTiO₃ layer with a thickness of 0.2 μm was formed as the barrier layer 40 having a single layer structure.

All of the samples 9 to 12 did not satisfy the relationship of CTE1>CTE2>CTE3. Specifically, a relationship of CTE2>CTE1>CTE3 was established in the sample 9, and a relationship of CTE2>CTE3>CTE1 was established in the samples 10 to 12.

Each of the samples 9 to 12 was checked for the presence or absence of cracking, and cracking was confirmed in all of the samples 9 to 12 after deposition of a capacitance unit and after deposition of a barrier layer.

From the results above, it was confirmed that in a case in which the relationship of CTE1>CTE2>CTE3 was satisfied, when the temperature falls from the deposition temperature, cracking occurring in the capacitance unit 30 of the thin-film capacitor 10 was prevented, and cracking occurring in the barrier layer 40 was also prevented. It was confirmed that in a case in which both CTE3/CTE1 and CTE3/CTE2 were larger than 0.3, cracking could be further prevented.

In addition, in order to check the relationship between each of the linear expansion coefficients (CTE1, CTE2, and CTE3) of the materials or the base 20, the capacitance unit 30, and the barrier layer 40, and cracking in a case in which the barrier layer was constituted of a plurality of layers, the inventors prepared a plurality of samples formed of different materials and checked the presence or absence of cracking regarding each of the samples. The table in FIG. 6 shows the results thereof. In the following description and the table in FIG. 6, a layer constituting the barrier layer 40, that is, a layer covering the second layer 42 is regarded as a third layer, and its linear expansion coefficient is indicated as CTE5.

In samples 13 to 24 shown in the table in FIG. 6, as the condition of after the barrier layer dipping test, each thereof was checked for the presence or absence of cracking after being dipped for ten minutes and after being dipped for an hour. When the dipping time was lengthened, minute cracking could be confirmed. Thus, the presence or absence of cracking could be checked with higher accuracy.

In the samples 13 to 15, a Ni foil with a thickness of 28 μm was used as the base 20. A laminate including seven Ni electrode layers with thicknesses of 0.5 μm and seven BaTiO₃ dielectric layers with thicknesses of 0.2 μm (total thickness of 4.9 μm) was used as the capacitance unit 30. In the sample 13, the barrier layer 40 had a two-layer structure constituted of a first layer formed of Al₂O₃ with a thickness of 0.5 μm and a second layer formed of SiN with a thickness of 1 μm. In the sample 14, the barrier layer 40 had a two-layer structure constituted of the first layer formed of Al₂O₃ with a thickness of 0.5 μm and the second layer formed of SiN with a thickness of 0.5 μm. In the sample 15, the barrier layer 40 had a two-layer structure constituted of the first layer formed of Al₂O₃ with a thickness of 0.5 μm and the second layer formed of SiN with a thickness of 0.2 μm. All of the samples 13 to 15 satisfied the relationship of CTE1>CTE2>CTE3.

Each of the samples 13 to 15 was checked for the presence or absence of cracking, and no cracking was confirmed in all of the samples 13 to 15 after deposition of a capacitance unit, after deposition of a barrier layer, and after the barrier layer dipping test of being dipped for ten minutes. In addition, regarding the samples 13 to 15, even after the barrier layer dipping test being dipped for an hour, no cracking was confirmed in the sample 15 in which CTE4/CTE1 and CTE4/CTE2 were 0.3 or smaller, the thickness of the second layer of the barrier layer was smaller than half the thickness of the first layer, and CTE4/CTE3 was larger than 0.3.

In the samples 16 to 18, a Ni foil with a thickness of 28 μm was used as the base 20. A laminate including seven Ni electrode layers with thicknesses of 0.5 μm and seven BaTiO₃ dielectric layers with thicknesses of 0.2 μm (total thickness of 4.9 μm) was used as the capacitance unit 30. In the sample 16, the barrier layer 40 had a two-layer structure constituted of the first layer formed of BaTiO₃ with a thickness of 0.5 μm and the second layer formed of SiN with a thickness of 1 μm. In the sample 17, the barrier layer 40 had a two-layer structure constituted of the first layer formed of BaTiO₃ with a thickness of 0.5 μm and the second layer formed of SiN with a thickness of 0.5 μm. In the sample 18, the barrier layer 40 had a two-layer structure constituted of the first layer formed of BaTiO₃ with a thickness of 0.5 μm and the second layer formed of SiN with a thickness of 0.2 μm. All of the samples 16 to 18 satisfied the relationship of CTE1>CTE2>CTE3.

Each of the samples 16 to 18 was checked for the presence or absence of cracking, and no cracking was confirmed in all of the samples 16 to 18 after deposition of a capacitance unit, after deposition of a barrier layer, and after the barrier layer dipping test of being dipped for ten minutes. In addition, regarding the samples 16 to 18, even after the barrier layer dipping test being dipped for an hour, no cracking was confirmed in the sample 18 in which CTE4/CTE1 and CTE4/CTE2 were 0.3 or smaller, the thickness of the second layer of the barrier layer was smaller than half the thickness of the first layer, and CTE4/CTE3 was larger than 0.3.

From the results above, it was confirmed that even if the barrier layer was constituted of a plurality of layers, in a case in which the relationship of CTE1>CTE2>CTE3 was satisfied, when the temperature falls from the deposition temperature, cracking occurring in the capacitance unit 30 of the thin-film capacitor 10 was prevented, and cracking occurring in the barrier layer 40 was also prevented. In addition, it was confirmed that in a case in which both CTE3/CTE1 and CTE3/CTE2 were larger than 0.3, cracking could be further prevented. Moreover, it was confirmed that even if the linear expansion coefficient CTE4 of the second layer 42 constituting the barrier layer 40 was relatively low, cracking was effectively prevented by causing the thickness of the second layer 42 corresponding to the outer layer to be smaller than half the thickness of the first layer 41 corresponding to the inner layer and performing design such that CTE4/CTE3 became larger than 0.3.

In the samples 19 to 21, similar to the samples 13 to 18, a Ni foil with a thickness of 28 μm was used as the base 20. A laminate including seven Ni electrode layers with thicknesses of 0.5 μm and seven BaTiO$_3$ dielectric layers with thicknesses of 0.2 μm (total thickness of 4.9 μm) was used as the capacitance unit 30.

In the sample 19, the barrier layer 40 had a two-layer structure constituted of the first layer formed of BaTiO$_3$ with a thickness of 0.5 μm and the second layer formed of Al$_2$O$_3$ with a thickness of 0.5 μm. In the sample 20, the barrier layer 40 had a three-layer structure constituted of the first layer formed of BaTiO$_3$ with a thickness of 0.5 μm, the second layer formed of Al$_2$O$_3$ with a thickness of 0.5 μm, and the third layer formed of SiN with a thickness of 0.4 μm. In the sample 21, the barrier layer 40 had a three-layer structure constituted of the first layer formed of BaTiO$_3$ with a thickness of 0.5 μm, the second layer formed of Al$_2$O$_3$ with a thickness of 0.5 μm, and the third layer formed of SiN with a thickness of 0.2 μm. All of the samples 19 to 21 satisfied the relationship of CTE1>CTE2>CTE3.

Each of the samples 19 to 21 was checked for the presence or absence of cracking, and no cracking was confirmed in all of the samples 19 to 21 after deposition of a capacitance unit, after deposition of a barrier layer, and after the barrier layer dipping test of being dipped for ten minutes. In addition, even after the barrier layer dipping test being dipped for an hour, no cracking was confirmed in the sample 19 in which the linear expansion coefficient CTE3 of the first layer was higher than the linear expansion coefficient CTE4 of the second layer and all of CTE3/CTE1, CTE3/CTE2, CTE4/CTE1, and CTE4/CTE2 were larger than 0.3. Moreover, even after the barrier layer dipping test being dipped for an hour, no cracking was confirmed even in the sample 21 in which CTE5/CTE1 and CTE5/CTE2 were 0.3 or smaller, the thickness of the third layer of the barrier layer was smaller than half the thickness of the second layer, and CTE5/CTE4 was larger than 0.3.

From the results above, it was confirmed that even if the barrier layer was constituted of a plurality of layers, in a case in which the relationship of CTE1>CTE2>CTE3 was satisfied, when the temperature falls from the deposition temperature, cracking occurring in the capacitance unit 30 of the thin-film capacitor 10 was prevented, and cracking occurring in the barrier layer 40 was also prevented. In addition, it was confirmed that in a case in which both CTE3/CTE1 and CTE3/CTE2 were larger than 0.3, cracking could be further prevented. Moreover, it was confirmed that in a case in which the linear expansion coefficient CTE3 of the first layer corresponding to the inner layer was higher than the linear expansion coefficient CTE4 of the second layer corresponding to the outer layer, and both the ratio of the linear expansion coefficient of each of the layers constituting the barrier layer to the linear expansion coefficient of the base (CTE3/CTE1 and CTE4/CTE1) and the ratio of the linear expansion coefficient of each of the layers constituting the barrier layer to the linear expansion coefficient of the capacitance unit (CTE3/CTE2 and CTE4/CTE2) were larger than 0.3, cracking was effectively prevented. In addition, it was confirmed that even if the linear expansion coefficient CTE5 of the third layer constituting the barrier layer 40 was relatively low, cracking was effectively prevented by causing the thickness of the third layer corresponding to the outer layer to be smaller than half the thickness of the second layer corresponding to the inner layer and performing design such that CTE5/CTE4 became larger than 0.3.

In the samples 22 to 24, similar to the samples 13 to 21, a Ni foil with a thickness of 28 μm was used as the base 20. A laminate including seven Ni electrode layers with thicknesses of 0.5 μm and seven BaTiO$_3$ dielectric layers with thicknesses of 0.2 μm (total thickness of 4.9 μm) was used as the capacitance unit 30. In the sample 22, the barrier layer 40 had a three-layer structure constituted of the first layer formed of BaTiO$_3$ with a thickness of 0.2 μm, the second layer formed of Al$_2$O$_3$ with a thickness of 0.5 μm, and the third layer formed of SiN with a thickness of 0.2 μm. In the sample 23, the barrier layer 40 had a three-layer structure constituted of the first layer formed of BaTiO$_3$ with a thickness of 0.2 μm, the second layer formed of Al$_2$O$_3$ with a thickness of 0.5 μm, and the third layer formed of SiN with a thickness of 0.5 μm. In the sample 24, the barrier layer 40 had a three-layer structure constituted of the first layer formed of BaTiO$_3$ with a thickness of 0.2 μm, the second layer formed of Al$_2$O$_3$ with a thickness of 0.5 μm, and the third layer formed of SiO$_2$ with a thickness of 0.2 μm. All of the samples 22 to 24 satisfied the relationship of CTE1>CTE2>CTE3.

Each of the samples 22 to 24 was checked for the presence or absence of cracking, and no cracking was confirmed in all of the samples 22 to 24 after deposition of a capacitance unit, after deposition of a barrier layer, and after the barrier layer dipping test of being dipped for ten minutes. In addition, even after the barrier layer dipping test being dipped for an hour, no cracking was confirmed in the sample 22 in which CTE5/CTE1 and CTE5/CTE2 were 0.3 or smaller, the thickness of the third layer of the barrier layer was smaller than half the thickness of the second layer, and CTE5/CTE4 was larger than 0.3.

From the results above, it was confirmed that even if the barrier layer was constituted of a plurality of layers, in a case in which the relationship of CTE1>CTE2>CTE3 was satisfied, when the temperature falls from the deposition temperature, cracking occurring in the capacitance unit 30 of the thin-film capacitor 10 was prevented, and cracking occurring in the barrier layer 40 was also prevented. In addition, it was confirmed that in a case in which both CTE3/CTE1 and CTE3/CTE2 were larger than 0.3, cracking could be further prevented. Moreover, it was confirmed that even in a case in which the linear expansion coefficient CTE5 of the third layer constituting the barrier layer 40 was relatively low, cracking was effectively prevented by causing the thickness of the third layer corresponding to the outer layer to be smaller than half the thickness of the second layer corresponding to the inner layer and performing design such that CTE5/CTE4 became larger than 0.3.

Hereinabove, the embodiment and the examples of the present disclosure have been described. However, the present disclosure can be subjected to various changes.

For example, the barrier layer may be constituted of a plurality of layers or may be a single layer. In a case in which the barrier layer is constituted of a plurality of layers, the number of layers can be suitably increased or reduced without being limited to two layers. In addition, the number of layers of the electrode layers and the dielectric layers constituting the capacitance unit can be suitably increased or reduced.

What is claimed is:

1. A thin-film capacitor comprising:
a base;
a capacitance unit provided on a main surface of the base, a plurality of electrode layers and a plurality of dielectric layers are alternately laminated in the capacitance unit in a normal direction of the main surface; and
a barrier layer made of an inorganic insulating material, covering a side surface of the capacitance unit and the main surface of the base continuously, and including a first layer in direct contact with the side surface of the capacitance unit,
wherein when a linear expansion coefficient of the base is CTE1, a linear expansion coefficient of the capacitance unit is CTE2, and a linear expansion coefficient of the first layer of the barrier layer is CTE3, a relationship of CTE1>CTE2>CTE3 is satisfied, and
the barrier layer is constituted of a plurality of layers, in two adjacent layers of the plurality of layers constituting the barrier layer, a linear expansion coefficient of an inner layer closer to the capacitance unit is higher than a linear expansion coefficient of an outer layer further away from the capacitance unit.

2. The thin-film capacitor according to claim 1, wherein the first layer of the barrier layer is in direct contact with the side surface of the capacitance unit and the main surface of the base, and
both CTE3/CTE1 and CTE3/CTE2 are larger than 0.3.

3. The thin-film capacitor according to claim 1, wherein both a ratio of the linear expansion coefficient of each of the layers constituting the barrier layer to the linear expansion coefficient of the base and a ratio of the linear expansion coefficient of each of the layers constituting the barrier layer to the linear expansion coefficient of the capacitance unit are larger than 0.3.

4. The thin-film capacitor according to claim 2, wherein both a ratio of the linear expansion coefficient of each of the layers constituting the barrier layer to the linear expansion coefficient of the base and a ratio of the linear expansion coefficient of each of the layers constituting the barrier layer to the linear expansion coefficient of the capacitance unit are larger than 0.3.

5. A thin-film capacitor comprising:
a base;
a capacitance unit provided on a main surface of the base, a plurality of electrode layers and a plurality of dielectric layers are alternately laminated in the capacitance unit in a normal direction of the main surface; and
a barrier layer made of an inorganic insulating material, covering a side surface of the capacitance unit and the main surface of the base continuously, and including a first layer in direct contact with the side surface of the capacitance unit,
wherein when a linear expansion coefficient of the base is CTE1, a linear expansion coefficient of the capacitance unit is CTE2, and a linear expansion coefficient of the first layer of the barrier layer is CTE3, a relationship of CTE1>CTE2>CTE3 is satisfied, and
when the barrier layer is constituted of a plurality of layers, in two adjacent layers of the plurality of layers constituting the barrier layer, a linear expansion coefficient of an outer layer further away from the capacitance unit is CTE3', and a linear expansion coefficient of an inner layer closer to the capacitance unit is CTE3", both CTE3'/CTE1 and CTE3'/CTE2 are 0.3 or smaller, a thickness of the outer layer is smaller than half a thickness of the inner layer, and CTE3'/CTE3" is larger than 0.3.

6. The thin-film capacitor according to claim 5, wherein the first layer of the barrier layer is in direct contact with the side surface of the capacitance unit and the main surface of the base, and
both CTE3/CTE1 and CTE3/CTE2 are larger than 0.3.

* * * * *